United States Patent
Heckmann et al.

(10) Patent No.: US 6,349,996 B1
(45) Date of Patent: Feb. 26, 2002

(54) ELECTRICALLY CONTROLLED DECENTRALIZED CONTROL SYSTEM IN A VEHICLE

(75) Inventors: Hans Heckmann, Karlsruhe; Reinhard Weiberle, Vaihingen/Enz; Bernd Kesch, Hemmingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/633,849

(22) Filed: Aug. 7, 2000

(30) Foreign Application Priority Data

Aug. 6, 1999 (DE) .......................... 199 37 156

(51) Int. Cl.⁷ .............................................. B60T 8/88
(52) U.S. Cl. ................. 303/122.04; 303/20; 303/113.4; 701/76
(58) Field of Search ............................. 303/20, 3, 155, 303/113.4, 122.03, 122.04; 701/76

(56) References Cited

U.S. PATENT DOCUMENTS

| | | | | |
|---|---|---|---|---|
| 5,752,748 A | * | 5/1998 | Schramm et al. | 303/20 |
| 5,255,962 A | * | 10/1998 | Neuhaus et al. | 303/188 |
| 5,952,799 A | * | 9/1999 | Maisch et al. | 303/20 |
| 6,029,108 A | * | 2/2000 | Belschner | 701/70 |
| 6,157,887 A | * | 12/2000 | Zittlau | 303/122.03 |
| 6,206,488 B1 | * | 3/2001 | Binder et al. | 303/122.04 |

FOREIGN PATENT DOCUMENTS

| | | |
|---|---|---|
| DE | 196 34 567 | 3/1998 |
| DE | 198 26 131.4 | 12/1999 |

* cited by examiner

Primary Examiner—Robert J. Oberleitner
Assistant Examiner—Mariano Sy
(74) Attorney, Agent, or Firm—Kenyon & Kenyon

(57) ABSTRACT

An electrically controlled, decentralized control system in a vehicle having control modules, each of which is assigned a vehicle control element for actuation. The actuation is carried out as a function of a driver's input which is formed in each control module on the basis of sensor signals that represent the actuation of an actuating element by the driver. In this context, at least three sensors are provided for detecting the actuating signals, one actuating signal being supplied directly to each control module.

12 Claims, 1 Drawing Sheet

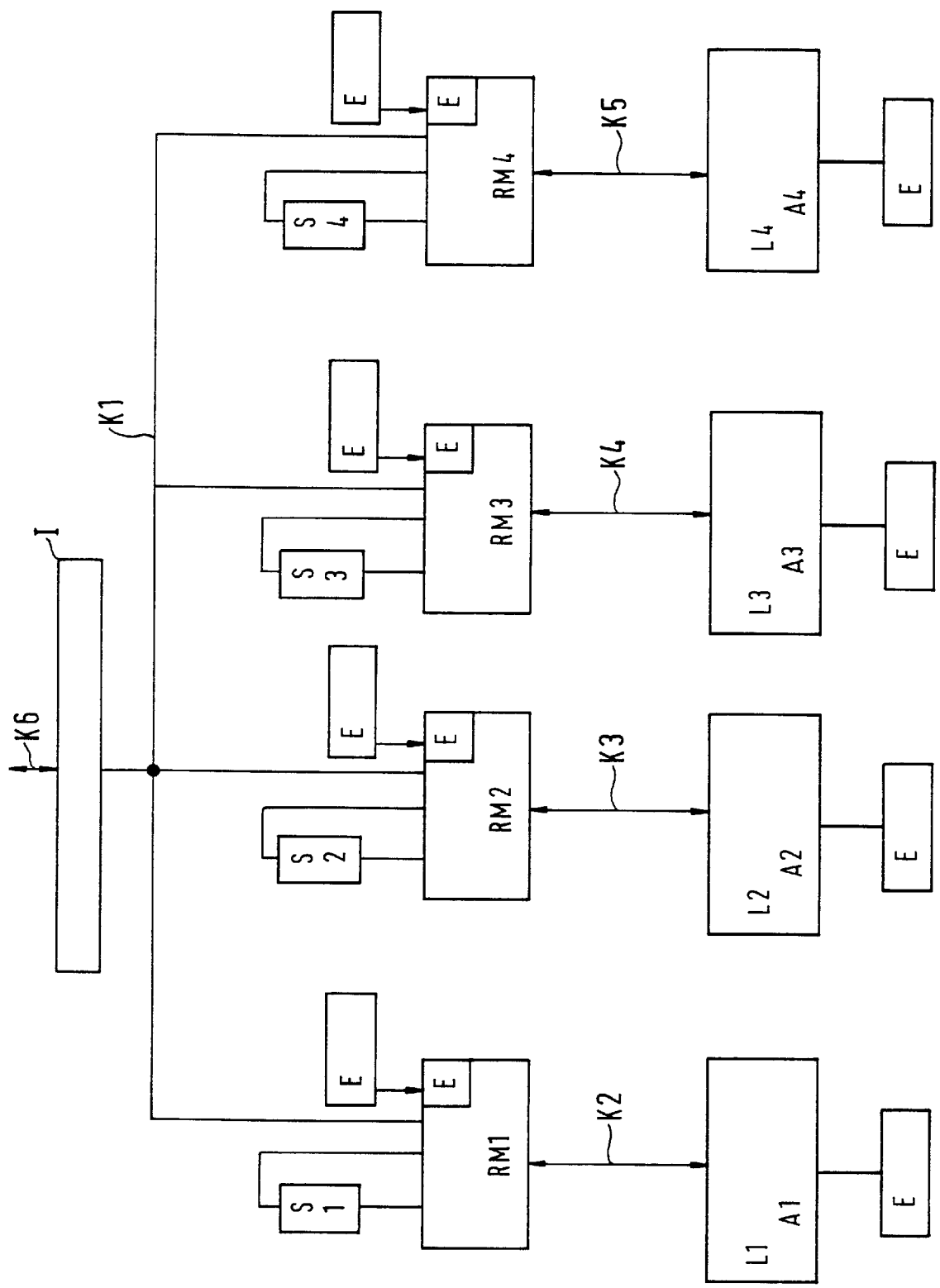

ELECTRICALLY CONTROLLED DECENTRALIZED CONTROL SYSTEM IN A VEHICLE

FIELD OF THE INVENTION

The present invention relates to an electrically controlled, decentralized control system in a vehicle, e.g., a braking system.

BACKGROUND INFORMATION

For such control systems, which generally are not equipped with a mechanical, hydraulic or pneumatic backup system, special attention must be given to availability, even in the case of a fault. An example of an electrically controlled, decentralized braking system which satisfactorily meets the demands made is described in German Patent No. 196 34 567 (Great Britain No. GB-2 316 726). This known braking system for a motor vehicle (brake-by-wire) has a decentralized design and possesses a control module for ascertaining the driver's braking input (desire) and control modules for adjusting the braking force at the individual vehicle wheels; in one preferred exemplary embodiment, such a control module actuates a group of wheel brakes (combined axle-wise or diagonally). To connect the control module ascertaining the driver's input to the control modules for adjusting the braking force, at least one communication system is provided on which the control modules exchange data among themselves. In order to ensure at least partial operability of the braking system in the case of a fault, further independent communication connections are provided between the control module for ascertaining the driver's input and the control modules for adjusting the braking force. The signals from several (two or three) sensors which detect the actuation of the brake pedal by the driver are supplied to the control module for ascertaining the driver's input. In the control module, these sensor signal values are checked for correctness by at least two computer units which are independent of one another, and in each case a value is determined for the driver's braking input which is then checked for correctness by the respective other computer unit. The resulting error-free driver's input value, optionally corrected axle-individually or wheel-individually as a function of further quantities such as axle load or of functions such as a vehicle dynamics control, is then transmitted via the communication system to the individual control modules for adjusting the braking force.

Because of the separate modules, each equipped with at least two computer units, the known electrically controlled, decentralized control system has a relatively high expenditure.

An object of the present invention is to provide measures which make it possible to reduce the expenditure for an electrically controlled, decentralized control system, without endangering the availability and performance reliability of the control system. German Patent Application No. 198 26 131.4, not pre-published, describes constructing control modules as so-called fail-operational units which continue to be functional in the event of a single fault. Such control modules are designed to be fault-tolerant, e.g., by implementation with the aid of a redundant microcomputer system composed of at least two microcomputers and a monitoring component. The microcomputers and the monitoring component communicate via the internal communication channel which is realized, for example, by a serial bus system or with serial interfaces. Implemented within the microcomputer system for carrying out the control tasks are at least two independent programs which reciprocally check their results. In this way, the module remains fully functional in the event of an individual fault.

SUMMARY OF THE INVENTION

By the direct feeding of in each case one actuating signal of an operating control element, e.g. of a brake pedal, to control modules which control at least one selected control element (e.g., a wheel brake)—at least two different actuating signals being provided—the costly control module for ascertaining the driver's input is dispensed with and the expenditure for an electrically controlled, decentralized control system is considerably reduced.

The mutual exchange of the actuating signals between the control modules, that is to say, the exchange of partial results between these modules with respect to the driver's input, this exchange being via a communication system connecting these units, ensures the availability of the driver's input ascertainment even if one of the sensors for detecting an actuating signal malfunctions, so that there is no need to fear any restrictions vis-a-vis the related art with respect to the availability of the control system.

It is particularly advantageous if the communication system connecting the modules is a time-controlled communication system, e.g., a so-called TTP/C bus. This permits simultaneous acquisition of the actuating signals in the individual modules, since a synchronous system time is available.

A special advantage is that at least one actuating signal, from which the actuation of the operating control element is derivable, is available in each control module, even if the communication system malfunctions. This yields an at least partial availability of the braking system, even in the event of a failure of the communication system.

Particularly advantageous is that the electrically controlled braking system formed in this manner is usable in conjunction with all electrically controlled brake actuators, e.g., with electrohydraulic brake actuators, electropneumatic, electromagnetic or electromotive actuators.

BRIEF DESCRIPTION OF THE DRAWING

The FIGURE shows a preferred exemplary embodiment of a decentralized control system, using as an example an electrically controlled braking system, in which actuating signals of a brake-actuating device are input (read in) in a decentralized manner.

DETAILED DESCRIPTION

Described in the following with reference to the FIGURE is a preferred exemplary embodiment of a system structure for a brake-by-wire system having electrically triggered actuators. A two-axle, four-wheel vehicle is provided with four wheel modules (RM1 through RM4), each of which triggers one wheel brake via an electrohydraulic, electropneumatic, electromotive or electromagnetic actuator. The actuators are designated in the FIGURE by A1 through A4 and are allocated a power electronics L1 through L4. To detect the driver's input, sensors S1 through S4 are provided which are mounted in the area of a brake-actuating device, e.g., a brake pedal, and which ascertain the degree of actuation of the actuating device, if desired, in various ways. In the preferred exemplary embodiment, four sensors are provided; in other advantageous exemplary embodiments, three sensors are provided, two wheel modules being supplied with the same actuating signal. In one exemplary embodiment, these are the wheel modules which actuate the brakes of the rear axle. Via a communication system K1 which interconnects the wheel modules, said wheel modules mutually exchange the input actuating-signal values and/or driver's input values derived from them. Consequently, at least three actuating signals of the actuating device and/or driver's input signals derived from them exist in each of the wheel modules, thus permitting ascertainment of the driver's braking input based on at least three signal values in each of the wheel modules.

Based on the driver's input formed, the manipulated variables for triggering the actuators are then formed and are transmitted via the communication links or triggering lines K2 through K5 to the power units of the actuators. In addition, wheel modules RM1 through RM4, as well as power units and actuators L1 through L4 and A1 through A4 are powered by at least one reliable energy circuit or at least two independent energy circuits of vehicle electrical system E. Communication system K1 is connected by way of an interface I to a further communication system K6, via which operating quantities of other control systems are received or information from the braking system is output to other control systems. In one exemplary embodiment, control units which, supplied with information, calculate higher-level functions influencing the brakes such as an operating-dynamics control, a traction control system, etc., are also connected via communication system K6. Brake-input values are transmitted from these control units to the wheel-module units.

Thus, the FIGURE describes a decentralized sensor evaluation in a system having distributed control modules in systems that are critical with regard to safety, e.g., in brake-by-wire systems or other systems with distributed control units such as steering systems, electrical actuating systems, etc. In this context, the driver's input is formed on the basis of a plurality of actuating signals which in each case are input in a decentralized manner by the control modules and are validated (checked for plausibility) by mutual comparison in order to detect and exclude faulty signals and to carry out the control on the basis of error-free signals.

As presented above, the exemplary braking system is composed of four wheel modules RM1 through RM4 for regulating the braking force at the allocated wheel brakes with the aid of actuators A1 through A4. The setpoint value for the magnitude of the braking force to be set is predefined via sensors S1 through S4 at the foot pedal. For safety reasons, a plurality of sensors are connected so that, if one sensor malfunctions, it is possible to continue ascertaining the setpoint value from the remaining sensors. In the preferred exemplary embodiment, the sensors use different measuring principles; for example, the pedal travel, the pedal angle or the force between the driver's foot and the pedal is detected. It is important that there be a clear connection between the driver's braking input and the measuring signal. A setpoint value is then calculated from the sensor signals, e.g., by averaging, minimal-value selection, maximum-value selection or similar logic operations. Since, during fault-free operation, after the conversion of their signals into a braking-input signal, all the sensors deliver the same braking-force signal as the braking input of the driver (within the framework of tolerances), the faulty sensor channel (sensor, line, plug, transducer, etc.) is determined from deviations between the braking-input signals. Given at least three sensor signals, the faulty sensor signal can be determined by a two-out-of-three selection which is described within the scope of the related art indicated at the outset.

In the decentralized system having distributed control modules shown in the FIGURE, one actuating signal is supplied to each control module. When working with three sensors, which is the case in the preferred exemplary embodiment, the same actuating signal is fed to two wheel modules, e.g., those of the rear axle. Each wheel module forms a driver's braking input signal from the actuating signal fed to it, and transmits this driver's braking input signal and/or the sensor signal to the other wheel modules via communication system K1. The sensor signals and/or driver's input signals of the other wheel modules are received by the wheel module via communication system K1, it being possible to identify these same signals, given the use of only three sensors. On the basis of the at least three different actuating signals and/or four driver's input signals now existing, the wheel module, according to the logic operation predefined for it, forms the total driver's input which it transmits to the power unit and the actuator allocated to it, for the adjustment.

In the preferred exemplary embodiment, communication system K1 is a serial communication system. The formation of the driver's input in each wheel module from the supplied sensor signals and/or driver's input signals is initiated by checking the values for signal consistency. A faulty sensor channel is ascertained by comparing the signal values. In this case, the corresponding signal is excluded from the formation of the driver's input. Since at least three different signals are available, thus still at least two in the case of a fault, the driver's input can be reliably calculated from the remaining error-free signals on the basis of the remaining values in the event one signal channel malfunctions. In response to a malfunction of a sensor channel, the driver is informed, e.g., via a warning lamp or a similar means of information about the prevailing fault condition. The braking process continues to function as during normal operation.

Even if communication system K1 fails, one sensor signal is still available to each control module for an emergency operation.

What is claimed is:

1. An electrically controlled, decentralized control system in a vehicle, comprising:

electrically triggered actuators;

control modules situated in a decentralized manner, each of the control modules actuating a respective control element of the vehicle via a respective one of the electrically triggered actuators; and at least three measuring devices for ascertaining a magnitude of actuation of an actuating device by a driver of the vehicle, each of the at least three measuring devices providing a respective sensor signal directly to a respective one of the control modules.

2. The system according to claim 1, wherein the system is an electronically controlled braking system.

3. The system according to claim 1, wherein the control modules include wheel modules, each of the wheel modules ascertaining a braking input signal of the driver from the sensor signal supplied to it.

4. The system according to claim 1, wherein the control modules are interconnected via a communication system, one of the control modules transmitting at least one of an actuating signal value supplied to it and a driver's input value ascertained from a supplied actuating signal to other of the control modules via the communication system.

5. The system according to claim 4, wherein the communication system exhibits a deterministic behavior, and the control modules connected to the communication system use a global system time for synchronization.

6. The system according to claim 1, wherein at least one of actuating signals and driver's input values of other of the control modules are input in each of the control modules, and a driver's input for a control element to be controlled is ascertained based on values available.

7. The system according to claim 1, wherein each of the control modules checks available signal values for signal consistency, a faulty value being ascertained and excluded in response to a lack of signal consistency.

8. The system according to claim 1, wherein, in case of a fault, a driver's input is ascertained in each of the control modules based on fault-free signal values.

9. The system according to claim 1, wherein the measuring devices ascertain a driver's braking-input value, the braking-input value including at least one of a braking-force value and braking-torque value.

10. The system according to claim 2, wherein the braking system has four control modules, one at each wheel of the vehicle, and three actuation sensors, the same signal being supplied to two of the control modules.

11. The system according to claim 10, wherein the two control modules are the control modules controlling a rear-axle brake.

12. The system according to claim 1, further comprising a communication system connecting the control modules, the communication system including an interface to a further communication system via which the control system is connected to other control units.

* * * * *